US011689231B2

(12) United States Patent
Ma et al.

(10) Patent No.: US 11,689,231 B2
(45) Date of Patent: Jun. 27, 2023

(54) CORRECTED AIR-HANG RESPONSE USING CROSSTALK MEASUREMENT

(71) Applicant: Halliburton Energy Services, Inc., Houston, TX (US)

(72) Inventors: Jin Ma, Houston, TX (US); Matthew Chase Griffing, Kingwood, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 153 days.

(21) Appl. No.: 17/461,417

(22) Filed: Aug. 30, 2021

(65) Prior Publication Data
US 2023/0067272 A1    Mar. 2, 2023

(51) Int. Cl.
*H04B 1/10* (2006.01)
*E21B 47/13* (2012.01)

(52) U.S. Cl.
CPC ........... *H04B 1/1027* (2013.01); *E21B 47/13* (2020.05)

(58) Field of Classification Search
CPC .................................................. H04B 1/1027
See application file for complete search history.

(56) References Cited

U.S. PATENT DOCUMENTS

| 9,303,506 | B2* | 4/2016 | Herrera | E21B 47/017 |
| 2004/0084189 | A1* | 5/2004 | Hosie | E21B 34/101 |
| | | | | 166/66 |
| 2010/0097065 | A1* | 4/2010 | Itskovich | G01V 3/28 |
| | | | | 324/339 |
| 2021/0157027 | A1 | 5/2021 | Wu et al. | |

* cited by examiner

*Primary Examiner* — Hsinchun Liao
(74) *Attorney, Agent, or Firm* — Kilpatrick Townsend & Stockton LLP (57) ABSTRACT

A measurement device can be provided for a tubular string of a drilling subsystem. The measurement device can include a transmitter and a receiver. A cover can be applied to at least one of the receiver or the transmitter. While at least one of the receiver or the transmitter is covered by the cover, an amount of crosstalk can be measured. The cover can be removed from the measurement device. Subsequent to removing the cover from the measurement device, an air-hang response of the receiver and the transmitter can be measured in an air-hang configuration of the tubular string. A corrected air-hang response of the measurement device can be determined by subtracting the amount of crosstalk from the air-hang response.

20 Claims, 5 Drawing Sheets

CORRECTED AIR-HANG RESPONSE USING CROSSTALK MEASUREMENT

TECHNICAL FIELD

The present disclosure relates generally to wellbore device calibration and, more particularly (although not necessarily exclusively), to determining a corrected air-hang response using crosstalk measurements of a wellbore measurement device.

BACKGROUND

A wellbore can be formed in a subterranean formation for extracting produced hydrocarbon or other suitable material. One or more wellbore operations can be performed with respect to the wellbore (e.g., to extract the produced hydrocarbon, etc.). The wellbore operations can include or otherwise involve gathering data about the wellbore. The data can include information about downhole conditions or other suitable information. Tools for gathering the data may be calibrated while outside of the wellbore, but the calibration data may include crosstalk data. The crosstalk can include an unwanted transfer of signals between communicative channels (e.g., transmitters and receivers, etc.), and the crosstalk may be considered undesirable since the crosstalk may distort information about the wellbore. Other calibration methods may not account for or otherwise remove the crosstalk from the calibration data.

DETAILED DESCRIPTION

Certain aspects and examples of the present disclosure relate to determining a corrected air-hang response using a crosstalk measurement determined using a wellbore measurement device with a cover. The wellbore measurement device can include, or can be positioned on, one or more wellbore tools that can be positioned downhole in the wellbore. The wellbore measurement device can be positioned on a tubular and can detect information about the wellbore such as downhole conditions or other suitable information. The crosstalk measurement can include or represent a measure of crosstalk with respect to the wellbore tools. For example, the crosstalk can include an electromagnetic signal that originated and terminated in the wellbore measurement device without exiting the wellbore measurement device. The crosstalk measurement can be determined by using a cover that can be applied to a transmitter, a receiver, or a combination thereof with respect to the wellbore measurement device. The cover can include a metallic foil, a soft metal cover, a faraday cage, or other suitable cover that can shield, attenuate, or otherwise block electromagnetic signals. The crosstalk measurement can be used to determine the corrected air-hang response of the wellbore tools. For example, the crosstalk measurement can be deducted from the conventional, air-hang response measurement of the wellbore tools, and the resulting value can be the corrected air-hang response of the wellbore tools.

An air-hang calibration process can be performed with respect to one or more wellbore tools such as logging-while-drilling resistivity tools or other suitable tools that can be used downhole in the wellbore. Other measurement tools can include inserts and electronics designed to ensure no crosstalk signals between a receiver and a transmitter such that desired signals are not contaminated with crosstalk. However, residual crosstalk may remain due to signal leaking between inserts, for example, due to insufficient pressure induced by a loose insert connection. Residual crosstalk may not occur during downhole drilling as enough pressure may be applied to the tool string to tightly shield the insert connections. However, residual crosstalk may occur frequently in the airhang calibration process over an open ground where there may not be enough pressure on the connection.

One or more operations can be added to the airhang calibration process to remove any crosstalk error from the airhang calibration process. By removing the crosstalk error, the air-hang calibration can be improved. Accordingly, an increased air-hang calibration can yield an improved airhang accuracy of the wellbore tools (e.g., logging-while-drilling resistivity tools). The airhang calibration process can involve measuring a response of one or more wellbore tools in an air-hang configuration. The air-hang response can be used to normalize a response of the wellbore tools in a subterranean formation, in which the wellbore is formed, to provide accurate formation resistivity readings.

Other air-hang processes may measure a tool response in air, which can include any crosstalk signals that may not be desired. Since the airhang process includes a different setup and environment compared to downhole in the wellbore (e.g. much smaller tool string pressure, etc.), the crosstalk from the other air-hang processes may be different from the crosstalk associated with downhole processes. The air-hang calibration process described herein can include an additional step that can include measuring the crosstalk of the wellbore tool in air. The measured crosstalk can be deducted from measured air-hang response so that the air-hang coefficients or responses can be corrected for crosstalk error. The additional step can improve the accuracy of logging-while-drilling resistivity readings compared to using a process without the additional step.

In some examples, measuring crosstalk associated with the wellbore tool can involve measuring signals that are transmitted inside the tubing of the wellbore tool from transmitter to receiver or in other suitable directions. A cover can be applied to the transmitter, to the receiver, to other components of the wellbore tool, or to a combination thereof. The cover can include metal foils, faraday cages, or other suitable covers for blocking or otherwise shielding electromagnetic signals. By using the cover, electromagnetic signals originating in the wellbore tool may not be able to be transmitted externally through air outside of the wellbore tool. Without crosstalk, a measured amount of signal using the cover may be essentially zero (e.g., exactly zero or otherwise sufficiently close to zero to approximate a value of zero). A non-zero signal in this configuration may indicate that crosstalk is present in the wellbore tool. The crosstalk can be caused by insert couples or by other suitable sources of crosstalk. The signal can be determined via calculations of Amp and Phase. The Amp and the Phase relating to the wellbore tool can be determined using Equation 1 and Equation 2, respectively:

$$\text{Amp} = -20 \times \log_{10}(\|Vrx\|) \quad (1)$$

$$\text{Phase} = \text{atan2}\left(\frac{\text{image }(Vrx)}{\text{real }(Vrx)}\right) \times 180/\pi \quad (2)$$

where the complex voltage (e.g., the signal) in the frequency domain is measured as Vrx. In some examples, Vrx may be the measured crosstalk when using the cover on the wellbore tool.

Subsequent to measuring the crosstalk, the cover can be removed from the wellbore tool, and the wellbore tool can be measured in a standard air-hang configuration or process. The complex voltage (e.g., the signal) in the frequency domain on the receiver can be measured as Vra. A crosstalk correction can be performed using Vrx and Vra. For example, Equation 3 represents one technique to correct crosstalk to determine a corrected air-hang response of the wellbore tool:

$$Vcor = Vra - Vrx \quad (3)$$

where Vcor is the corrected airhang response of the tool.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
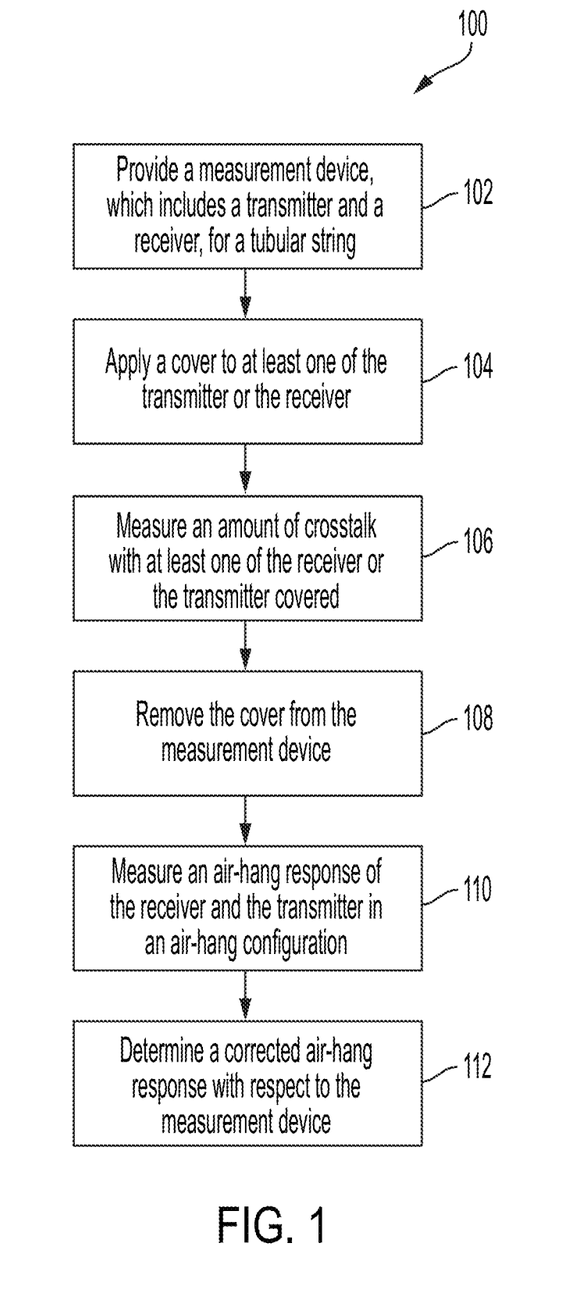
FIG. 1 is a flowchart of a process to measure and use crosstalk to determine a corrected air-hang response with respect to an air-hang calibration according to one example of the present disclosure.

FIG. 1 is a flowchart of a process 100 to measure and use crosstalk to determine a corrected air-hang response with respect to an air-hang calibration according to one example of the present disclosure. In some examples, the process 100 may be or include a calibration process for calibrating a wellbore measurement device outside of the wellbore. At block 102, the measurement device is provided for a tubular string of a drilling subsystem. The measurement device can include at least one transmitter, at least one receiver, other suitable components for the measurement device, or a combination thereof. The measurement device may be used in a wellbore for gathering information relating to the wellbore (e.g., data relating to downhole conditions of the wellbore). The measurement device may be calibrated prior to being positioned in the wellbore.

At block 104, a cover is applied to at least one of the transmitter or the receiver. The cover can include a metallic foil (e.g., aluminum foil, steel foil, etc.), a faraday cage, or any other suitable foil for shielding or otherwise blocking electromagnetic signals. The cover can be applied to the transmitter to shield electromagnetic signals originating at the transmitter from traveling outside of the wellbore measurement device. Additionally or alternatively, the cover can be applied to the receiver to shield electromagnetic signals traveling towards the receiver, for example, from outside of the wellbore measurement device. In some examples, the cover can be applied to the transmitter and to the receiver.

At block 106, an amount of crosstalk is measured with at least one of the transmitter or the receiver covered by the cover. While the wellbore measurement device includes the cover on at least one of the transmitter or the receiver, crosstalk may be directly measured. For example, the cover may prevent detection of electromagnetic signals that are not associated with the crosstalk. In some examples, the measured crosstalk can be Vrx as described with respect to Equation 1 and Equation 2. Once the receiver or the transmitter is covered, electromagnetic signals that are detected by the receiver may be labeled as measured crosstalk. In some examples, in response to the cover being applied to the transmitter, to the receiver, or to a combination thereof, the transmitter can transmit electromagnetic signals radially outward (e.g., similar to signals transmitted while the wellbore measurement device is positioned in the wellbore) from the wellbore measurement device for measuring the crosstalk.

At block 108, the cover is removed from the measurement device. In response to measuring the crosstalk, the cover can be removed from the receiver, from the transmitter, or from a combination thereof. Once the crosstalk is measured, the cover can be removed to make subsequent measurements relating to the air-hang calibration process.

At block 110, an air-hang response is measured with respect to the receiver and the transmitter while the measurement device is in an air-hang configuration. The measurement device can be hung in any suitable configuration. For example, the measurement device can be hung with the receiver positioned vertically above the transmitter. In another example, the measurement device can be hung with the transmitter positioned vertically above the receiver. In some examples, the measurement device can be hung for the air-hang calibration process in an air-hang configuration similar or identical to a downhole configuration that the measurement device may experience downhole in the wellbore. While in the air-hang configuration, the measurement device may send and receive electromagnetic signals. For example, the transmitter may transmit one or more electromagnetic signals, and the receiver may receive one or more electromagnetic signals. The received electromagnetic signals may be recorded as the air-hang response. In some examples, the air-hang response can be or include Vra as described with respect to Equation 3.

At block 112, a corrected air-hang response is determined with respect to the measurement device. The corrected air-hang response can be determined by subtracting the amount of crosstalk determined at the block 106 (e.g., Vrx) from the air-hang response determined at the block 110 (e.g., Vra). For example, the corrected air-hang response can be or include Vcor as described with respect to Equation 3. In some examples, the corrected air-hang response can be used to calibrate the measurement device for measuring data about the wellbore. For example, the measurement device can detect a formation response while in the wellbore, and the corrected air-hang response can be used to correct the formation response.

Figure 2:
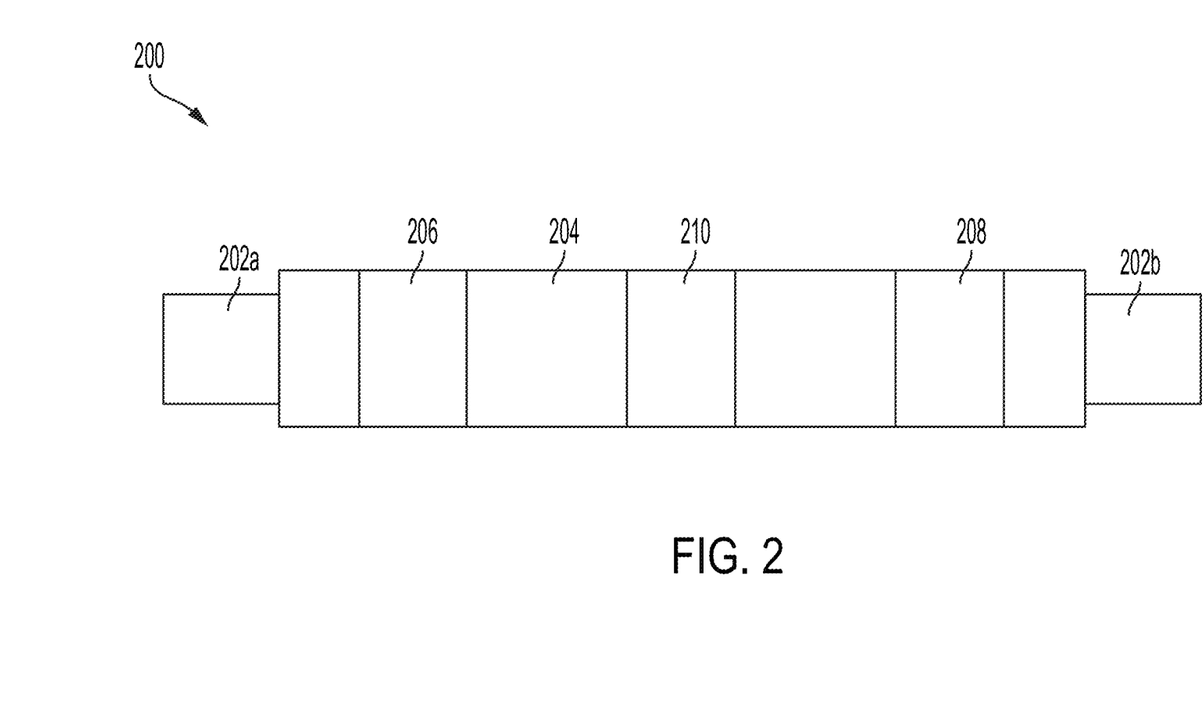
FIG. 2 is a simplified schematic of a tubular that includes a measurement device according to one example of the present disclosure.

FIG. 2 is a simplified schematic of a tubular 200 that includes a measurement device 204 according to one example of the present disclosure. The tubular 200 can include a work string, a tool string, or other suitable tubular that can be positioned in a wellbore for facilitating wellbore operations. The measurement device 204 can be positioned on the tubular 200 for positioning the measurement device 204 in the wellbore. In some examples, the measurement device 204 can include a logging-while-drilling resistivity tool or other suitable wellbore tool that can measure or otherwise gather data relating to the wellbore.

The measurement device 204 can include a receiver 206 and a transmitter 208. In some examples, the receiver 206 and the transmitter 208 can each be a transceiver that can transmit electromagnetic signals, receive electromagnetic signals, or a combination thereof. As illustrated, the receiver 206 can be positioned proximate to a first end 202a of the tubular 200, and the transmitter 208 can be positioned proximate to a second end 202b of the tubular 200, but the transmitter 208 and the receiver 206 can be positioned in any other suitable location with respect to the measurement device 204. In some examples, the receiver 206 can be positioned between the first end 202a of the tubular 200 and the transmitter 208. Additionally, the transmitter 208 can be positioned between the receiver 206 and the second end 202b of the tubular 200. The receiver 206 and the transmitter 208 can be positioned in any suitable location with respect to the measurement device 204 and the tubular 200 for measuring information relating to the wellbore. Additionally, while one receiver 206 and one transmitter 208 are illustrated as positioned on the measurement device 204, any suitable number of receivers 206 and transmitters 208 can be positioned on the measurement device 204 (e.g., less than one, more than one, etc.).

Figure 3:
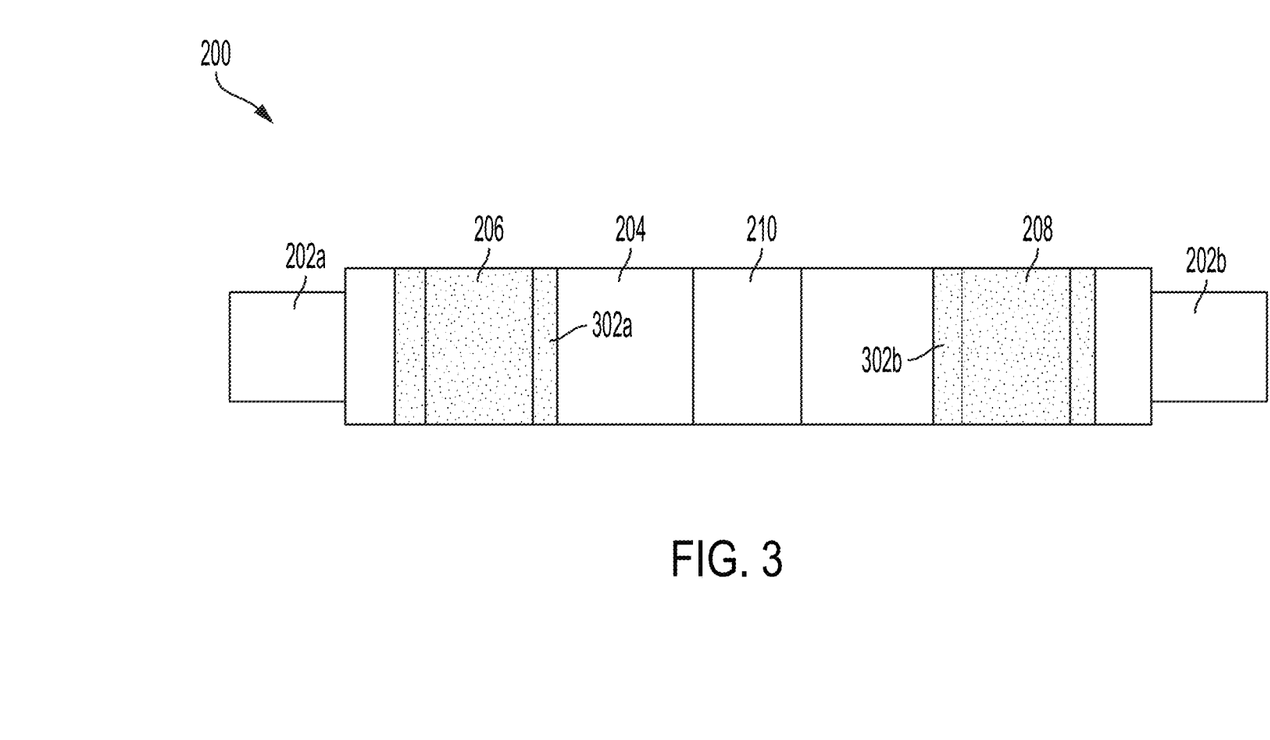
FIG. 3 is a simplified schematic of a tubular that includes a measurement device and a cover according to one example of the present disclosure.

FIG. 3 is a simplified schematic of a tubular 200 that includes a measurement device 204 and at least one cover 302 according to one example of the present disclosure. As illustrated in FIG. 3, and similar to FIG. 2, the measurement device 204 can include a receiver 206 and a transmitter 208 that can be positioned in any suitable location with respect to the measurement device 204 and the ends 202a-b of the tubular 200. The cover 302 can be applied to the receiver 206 (e.g., as cover 302a), to the transmitter 208 (e.g., as cover 302b), or to a combination thereof. In some examples, the covers 302a-b can be applied to the measurement device 204 by wrapping the covers 302a-b around the measurement device 204, by using adhesive to couple the covers 302a-b to the measurement device 204, or by other suitable techniques. As illustrated, the covers 302a-b are applied to both the receiver 206 and the transmitter 208, but, in some examples, the cover 302a or the cover 302b can be omitted (e.g., leaving one cover 302a or 302b applied to either the receiver 206 or the transmitter 208, respectively).

The covers 302a-b can include a metallic foil (e.g., aluminum foil, steel foil, etc.), a faraday cage, or one or more other suitable covers that can shield or otherwise block transmission of electromagnetic signals. The cover 302a can be applied to the receiver 206 to mitigate or prevent the receiver 206 from detecting one or more electromagnetic signals, for example from outside of the measurement device 204. The cover 302b can be applied to the transmitter 208 to mitigate or prevent electromagnetic signals originating from the transmitter 208 from passing through the exterior of the measurement device 204. In response to applying at least one cover 302 to the measurement device 204, crosstalk can be measured with respect to the measurement device 204. For example, the measurement device 204 may be positioned horizontally or otherwise in a crosstalk-measurement configuration. Detected electromagnetic signals in this configuration may be recorded as crosstalk, which can include signals that originate from and terminate in the measurement device 204 (e.g., without exiting the measurement device 204). The measured amount of crosstalk can be used to correct an air-hang configuration response.

In some examples, the measurement device 204 can include a connector ring 210. The connector ring 210 can connect a first portion (e.g., the portion that includes the receiver 206) of the measurement device 204 and a second portion (e.g., the portion that includes the transmitter 208) of the measurement device 204. In some examples, the connector ring 210 can include shielding that can prevent or mitigate transmission of electromagnetic signals from the transmitter 208 to the receiver 206 within the measurement device 204. But, the shielding may not be effective without pressures such as those experienced downhole in a wellbore. Accordingly, crosstalk signals may leak through the connector ring 210 during an air-hang calibration process that does not use at least one of the covers 302a-b.

Figure 4:
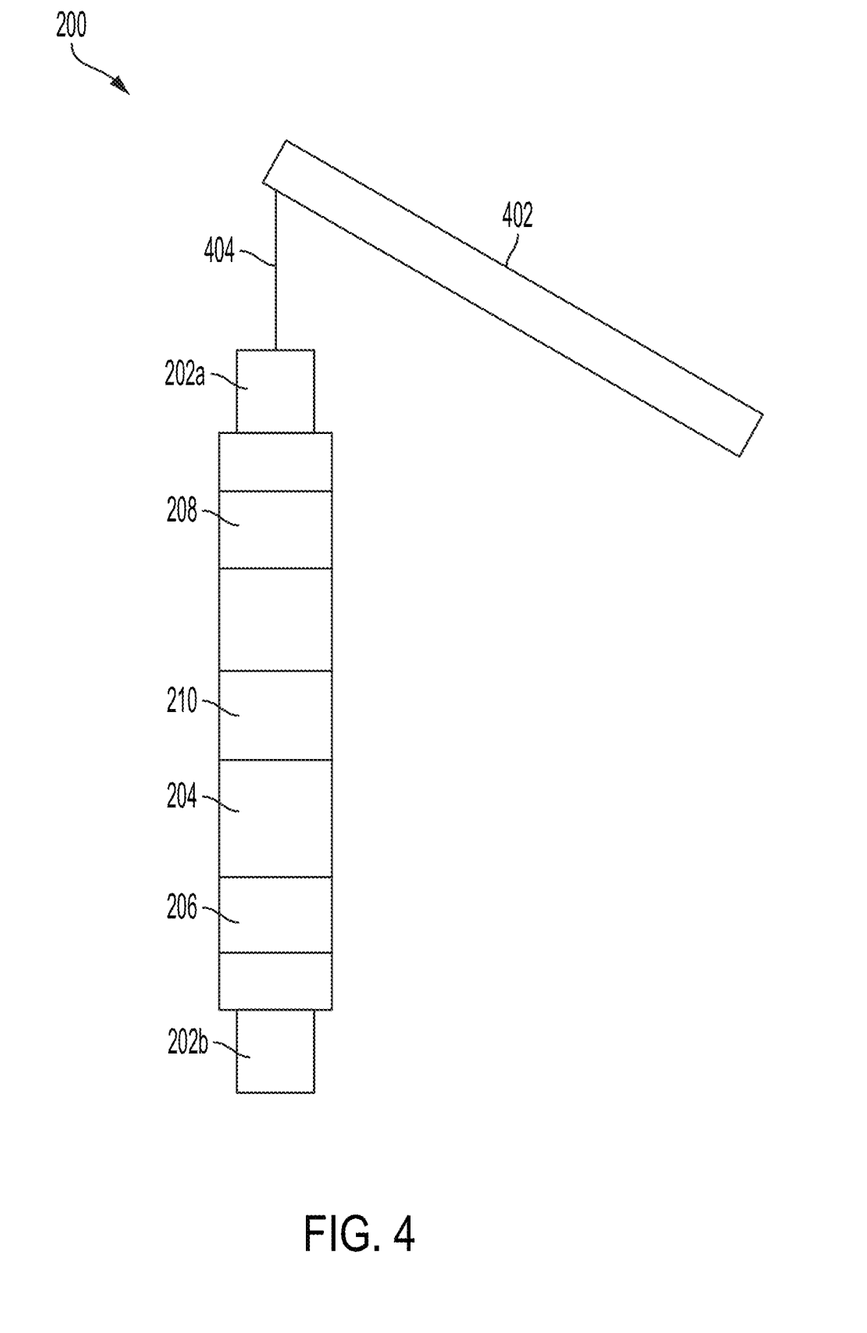
FIG. 4 is a simplified schematic of a tubular that includes a measurement device in an air-hang configuration according to one example of the present disclosure.

FIG. 4 is a simplified schematic of a tubular 200 that includes a measurement device 204 in an air-hang configuration according to one example of the present disclosure. The air-hang configuration can involve hanging the measurement device 204 (e.g., alone or while positioned on the tubular 200) using a hanging tool 402 and from a hanging string 404. While illustrated as substantially vertical, the measurement device 204 can experience any suitable angle for the air-hang configuration, and, in some examples, the air-hang configuration may be based on a downhole configuration that the measurement device 204 may experience when positioned in the wellbore.

Once in the air-hang configuration, an air-hang response can be determined with respect to the measurement device 204. For example, the transmitter 208 can transmit one or more electromagnetic signals, and the receiver 206 can receive one or more electromagnetic signals. The response detected by the receiver 206 (e.g., the complex voltage of the receiver 206) can be gathered and labeled as the air-hang response of the measurement device 204. In some examples, the air-hang response of the measurement device 204 can include an amount of crosstalk. The amount of crosstalk may be similar or identical to the measured crosstalk described with respect to FIG. 3 and can be used to determine a corrected air-hang response with respect to the measurement device 204. For example, the measured crosstalk can be deducted from the air-hang response to determine the corrected air-hang response, which can be used to calibrate the measurement device 204.

Figure 5:
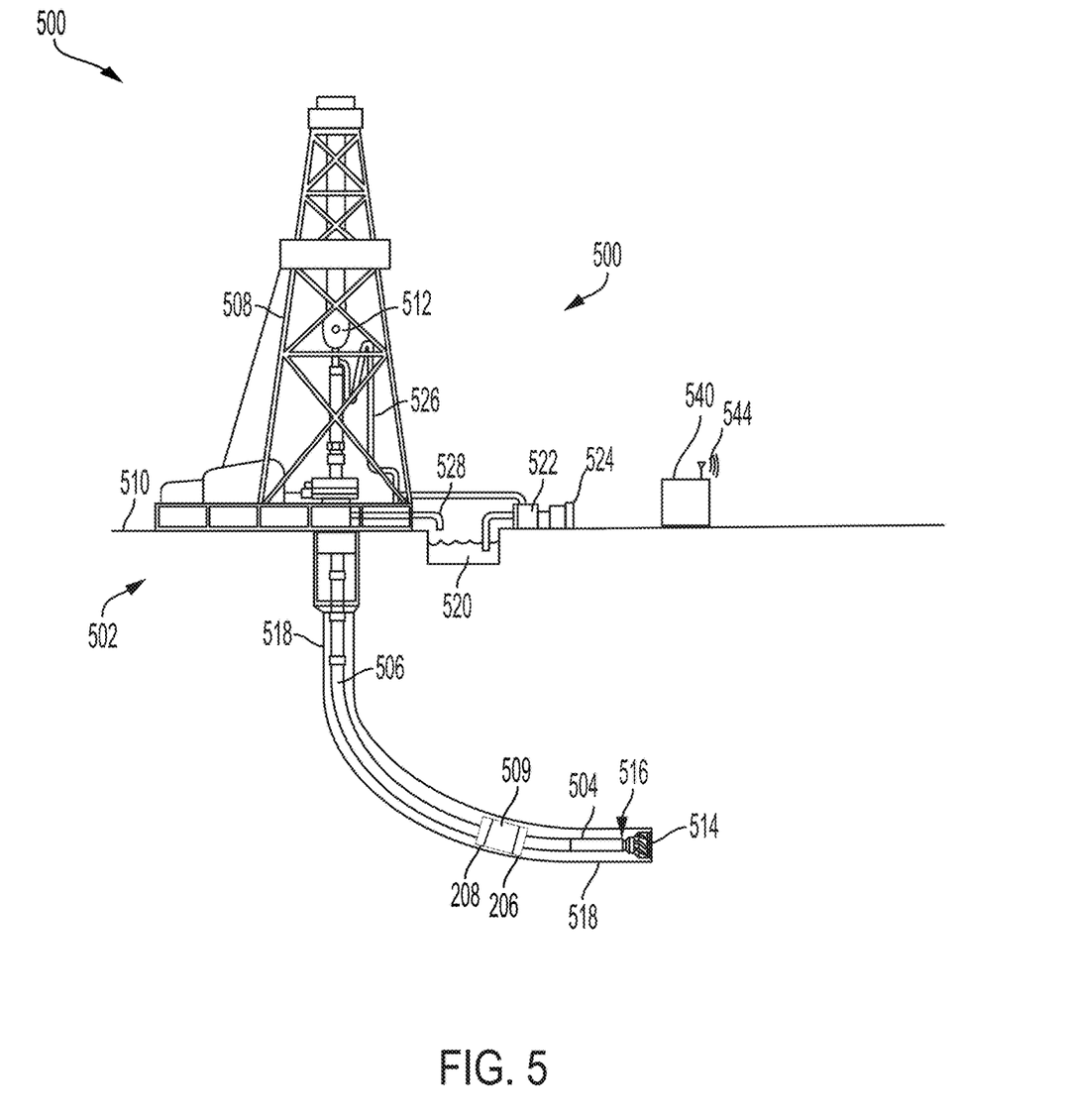
FIG. 5 is a schematic of a well system that includes a tubular that includes measurement device calibrated using a corrected air-hang response according to one example of the present disclosure.

FIG. 5 is a schematic of a well system 500 that includes a tubular that includes a measurement device calibrated using a corrected air-hang response according to one example of the present disclosure. The well system 500 can include a wellbore 518 that can be used to extract hydrocarbons from a subterranean formation 502. The wellbore 518 can be drilled using the well system 500. The well system 500 may drive a bottom hole assembly (BHA) 504 positioned or otherwise arranged at the bottom of a drill-string 506 extended into the subterranean formation 502 from a derrick 508 arranged at the surface 510. The derrick 508 can include a kelly 512 used to lower and raise the drill-string 506.

The BHA 504 may include a drill bit 514 operatively coupled to a tool string 516, which may be moved axially within a drilled wellbore 518 and can be attached to the drill-string 506. The tool string 516 may include one or more wellbore tools 509 for determining conditions in the wellbore 518 or for performing other suitable wellbore operations. The wellbore tool 509 may include or may be part of a measurement unit that may be deployable downhole in the wellbore 518 and may sense data relating to drilling conditions or any other suitable downhole data. The wellbore tool 509 may be the measurement device 204 and can include a receiver 206 and a transmitter 208. Additionally, the wellbore tool 509 may have been calibrated (e.g., using operations of the process 100 described above) using an air-hang calibration process that uses at least one of the covers 302a-b.

During operation, the drill bit 514 can penetrate the subterranean formation 502 to create the wellbore 518. The BHA 504 can control the drill bit 514 as the drill bit 514 advances into the subterranean formation 502. Fluid or "mud" from a mud tank 520 may be pumped downhole using a mud pump 522 that can be powered by an adjacent power source, such as a prime mover or motor 524. The mud may be pumped from the mud tank 520, through a stand pipe 526, which can feed the mud into the drill-string 506 and can convey the mud to the drill bit 514. The mud can exit one or more nozzles (not shown) arranged in the drill bit 514 and can thereby cool the drill bit 514. After exiting the drill bit 514, the mud can circulate back to the surface 510 via the annulus defined between the wellbore 518 and the drill-string 506. Cuttings and mud mixture that can be passed through a flow line 528 can be processed such that a cleaned mud is returned down hole through the stand pipe 526.

The wellbore tool 509 can monitor or otherwise detect data about the drilling operation or any other suitable operation that can be performed with respect to the well system 500. For example, the wellbore tool 509 can detect data relating to logging-while-drilling operations, relating to measuring-while-drilling operations, or relating to other suitable downhole or wellbore operations. The response determined by the wellbore tool 509 can be influenced by a calibration process performed with respect to the wellbore tool 509. For example, the wellbore tool 509 can be calibrated using the process 100. In some examples, the wellbore tool 509 may detect data relating to the wellbore 518 more accurately than a wellbore tool that is calibrated with other air-hang calibration processes.

In some examples, the well system 500 can include a computing device 540 that can be positioned belowground, aboveground, onsite, in a vehicle, offsite, etc. As illustrated with respect to FIG. 5, the computing device 540 is positioned at the surface 510 but can be positioned in any other suitable location. The computing device 540 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 540. In some examples, the computing device 540 can include input/output interface components (e.g., a display, printer, keyboard, touch-sensitive surface, and mouse) and additional storage. The computing device 540 can be communicatively coupled to the wellbore tool 509 (e.g., via a wireless connection or a wired connection).

The computing device 540 can include a communication device 544. The communication device 544 can represent one or more of any components that facilitate a network connection. In the example illustrated in FIG. 5, the communication device 544 is wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 544 can use acoustic waves, surface waves, vibrations, optical waves, or induction (e.g., magnetic induction) for engaging in wireless communications. In other examples, the communication device 544 can be wired and can include interfaces such as Ethernet, USB, IEEE 1394, or a fiber optic interface. In an example with at least one other computing device, the computing device 540 can receive wired or wireless communications from the other computing device and perform one or more tasks based on the communications and with respect to the well system 500. For example, the computing device 540 (or a non-transitory computer-readable medium included in the memory of the computing device 540, etc.) can perform the operations, or a subset thereof, described with respect to the process 100.

In some aspects, methods, tubular strings, and non-transitory computer-readable mediums for determining a corrected air-hang response are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: providing a measurement device for a tubular string of a drilling subsystem, the measurement device including a receiver and a transmitter separated by a portion of the tubular string; applying a cover to at least one of the receiver or the transmitter; measuring an amount of crosstalk with at least one of the receiver or the transmitter covered by the cover; removing the cover from the measurement device; subsequent to removing the cover from the measurement device, measuring an air-hang response of the receiver and the transmitter in an air-hang configuration of the tubular string; and determining a corrected air-hang response of the measurement device by subtracting the amount of crosstalk from the air-hang response.

Example 2 is the method of example 1, further comprising correcting a formation response determined by the measurement device in a wellbore using the corrected air-hang response.

Example 3 is the method of example 1, wherein the cover includes a metallic foil, a soft metal cover, or a faraday cage.

Example 4 is the method of example 1, wherein applying the cover to at least one of the receiver or the transmitter includes applying the cover to the receiver and to the transmitter.

Example 5 is the method of any of examples 1 and 4, wherein measuring the amount of crosstalk with at least one of the receiver or the transmitter covered by the cover includes measuring the amount of crosstalk with the receiver and the transmitter covered by the cover.

Example 6 is the method of example 1, wherein the measurement device is a logging-while-drilling resistivity tool.

Example 7 is the method of example 1, wherein measuring the air-hang response of the receiver and the transmitter in the air-hang configuration of the tubular string includes hanging, using a hanging device, the tubular string in the air-hang configuration such that the transmitter is substantially vertically offset from the receiver.

Example 8 is a tubular string comprising: a measurement device positionable on the tubing string and associated with a drilling subsystem, the measurement device comprising: a receiver; and a transmitter that is separated from the receiver by a portion of the tubing string; and a removable cover applicable to at least one of the receiver or the transmitter to facilitate measurement of an amount of crosstalk with respect to the measurement device, the removable cover removable from the measurement device to facilitate measurement of an air-hang response of the measurement device, the amount of crosstalk and the air-hang response usable to determine a corrected air-hang response.

Example 9 is the tubular string of example 8, further comprising: a first end, wherein the receiver is positioned between the first end and the transmitter; a second end, wherein the transmitter is positioned between the receiver and the second end; and a connector ring, wherein the portion of the tubular string includes the connector ring, wherein the connector ring is positioned between the receiver and the transmitter, and wherein the amount of crosstalk is transmittable through the connector ring.

Example 10 is the tubular string of example 8, wherein the corrected air-hang response is usable to correct a formation response determined by the measurement device in a wellbore.

Example 11 is the tubular string of example 8, wherein the removable cover includes a metallic foil, a soft metal cover, or a faraday cage.

Example 12 is the tubular string of example 8, wherein the removable cover is applicable to the receiver and to the transmitter, and wherein the amount of crosstalk is measureable with the receiver and the transmitter covered by the removable cover.

Example 13 is the tubular string of example 8, wherein the measurement device is a logging-while-drilling resistivity tool.

Example 14 is the tubular string of example 8, wherein the tubular string is hangable, using a hanging device, in an air-hang configuration such that the transmitter is substantially vertically offset from the receiver.

Example 15 is a non-transitory computer-readable medium comprising instructions that are executable by a processing device for causing the processing device to perform operations comprising: receiving a crosstalk response with respect to a measurement device provided for a tubular string of a drilling subsystem, the measurement device including a receiver and a transmitter separated by a portion of the tubular string, at least one of the receiver or the transmitter including a cover; receiving an air-hang response of the receiver and the transmitter in an air-hang configuration of the tubular string, the cover removed from the measurement device for the air-hang configuration; and determining a corrected air-hang response of the measurement device by subtracting the crosstalk response from the air-hang response.

Example 16 is the non-transitory computer-readable medium of example 15, wherein the operations further comprise correcting a formation response determined by the measurement device in a wellbore using the corrected air-hang response.

Example 17 is the non-transitory computer-readable medium of example 15, wherein the cover includes a metallic foil, a soft metal cover, or a faraday cage.

Example 18 is the non-transitory computer-readable medium of example 15, wherein the operation of receiving the crosstalk response with respect to the measurement device provided for the tubular string of the drilling subsystem includes receiving the crosstalk response with respect to the measurement device in which the receiver and the transmitter include the cover.

Example 19 is the non-transitory computer-readable medium of example 15, the measurement device is a logging-while-drilling resistivity tool.

Example 20 is the non-transitory computer-readable medium of example 15, wherein the operation of receiving the air-hang response of the receiver and the transmitter in the air-hang configuration of the tubular string includes receiving the air-hang response of the measurement device while the measurement device is hanging, via a hanging device, in the air-hang configuration such that the transmitter is substantially vertically offset from the receiver.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
providing a measurement device for a tubular string of a drilling subsystem, the measurement device including a receiver and a transmitter separated by a portion of the tubular string;
applying a cover to at least one of the receiver or the transmitter;
measuring an amount of crosstalk with at least one of the receiver or the transmitter covered by the cover;
removing the cover from the measurement device;
subsequent to removing the cover from the measurement device, measuring an air-hang response of the receiver and the transmitter in an air-hang configuration of the tubular string; and
determining a corrected air-hang response of the measurement device by subtracting the amount of crosstalk from the air-hang response.

2. The method of claim 1, further comprising correcting a formation response determined by the measurement device in a wellbore using the corrected air-hang response.

3. The method of claim 1, wherein the cover includes a metallic foil, a soft metal cover, or a faraday cage.

4. The method of claim 1, wherein applying the cover to at least one of the receiver or the transmitter includes applying the cover to the receiver and to the transmitter.

5. The method of claim 4, wherein measuring the amount of crosstalk with at least one of the receiver or the transmitter covered by the cover includes measuring the amount of crosstalk with the receiver and the transmitter covered by the cover.

6. The method of claim 1, wherein the measurement device is a logging-while-drilling resistivity tool.

7. The method of claim 1, wherein measuring the air-hang response of the receiver and the transmitter in the air-hang configuration of the tubular string includes hanging, using a hanging device, the tubular string in the air-hang configuration such that the transmitter is substantially vertically offset from the receiver.

8. A tubular string comprising:
a measurement device positionable on the tubing string and associated with a drilling subsystem, the measurement device comprising:
a receiver; and
a transmitter that is separated from the receiver by a portion of the tubing string; and
a removable cover applicable to at least one of the receiver or the transmitter to facilitate measurement of an amount of crosstalk with respect to the measurement device, the removable cover removable from the measurement device to facilitate measurement of an air-hang response of the measurement device, the amount of crosstalk and the air-hang response usable to determine a corrected air-hang response.

9. The tubular string of claim 8, further comprising:
a first end, wherein the receiver is positioned between the first end and the transmitter;
a second end, wherein the transmitter is positioned between the receiver and the second end; and
a connector ring, wherein the portion of the tubular string includes the connector ring, wherein the connector ring is positioned between the receiver and the transmitter, and wherein the amount of crosstalk is transmittable through the connector ring.

10. The tubular string of claim 8, wherein the corrected air-hang response is usable to correct a formation response determined by the measurement device in a wellbore.

11. The tubular string of claim 8, wherein the removable cover includes a metallic foil, a soft metal cover, or a faraday cage.

12. The tubular string of claim 8, wherein the removable cover is applicable to the receiver and to the transmitter, and wherein the amount of crosstalk is measureable with the receiver and the transmitter covered by the removable cover.

13. The tubular string of claim 8, wherein the measurement device is a logging-while-drilling resistivity tool.

14. The tubular string of claim 8, wherein the tubular string is hangable, using a hanging device, in an air-hang configuration such that the transmitter is substantially vertically offset from the receiver.

15. A non-transitory computer-readable medium comprising instructions that are executable by a processing device for causing the processing device to perform operations comprising:
receiving a crosstalk response with respect to a measurement device provided for a tubular string of a drilling subsystem, the measurement device including a receiver and a transmitter separated by a portion of the tubular string, at least one of the receiver or the transmitter including a cover;
receiving an air-hang response of the receiver and the transmitter in an air-hang configuration of the tubular string, the cover removed from the measurement device for the air-hang configuration; and
determining a corrected air-hang response of the measurement device by subtracting the crosstalk response from the air-hang response.

16. The non-transitory computer-readable medium of claim 15, wherein the operations further comprise correcting a formation response determined by the measurement device in a wellbore using the corrected air-hang response.

17. The non-transitory computer-readable medium of claim 15, wherein the cover includes a metallic foil, a soft metal cover, or a faraday cage.

18. The non-transitory computer-readable medium of claim 15, wherein the operation of receiving the crosstalk response with respect to the measurement device provided for the tubular string of the drilling subsystem includes receiving the crosstalk response with respect to the measurement device in which the receiver and the transmitter include the cover.

19. The non-transitory computer-readable medium of claim 15, the measurement device is a logging-while-drilling resistivity tool.

20. The non-transitory computer-readable medium of claim 15, wherein the operation of receiving the air-hang response of the receiver and the transmitter in the air-hang configuration of the tubular string includes receiving the air-hang response of the measurement device while the measurement device is hanging, via a hanging device, in the air-hang configuration such that the transmitter is substantially vertically offset from the receiver.

* * * * *